United States Patent
Norris et al.

(10) Patent No.: US 8,948,324 B2
(45) Date of Patent: Feb. 3, 2015

(54) COMMUNICATIONS DEVICE AND RELATED METHOD THAT DETECTS RADIO FREQUENCY (RF) INTERFERER ON A COMMUNICATIONS CHANNEL

(71) Applicant: Harris Corporation, Melbourne, FL (US)

(72) Inventors: James A. Norris, Fairport, NY (US); Brian J. Taylor, Webster, NY (US); William L. Tyler, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 16 days.

(21) Appl. No.: 13/705,251

(22) Filed: Dec. 5, 2012

(65) Prior Publication Data

US 2014/0153617 A1  Jun. 5, 2014

(51) Int. Cl.
*H04L 25/08* (2006.01)
*H04L 27/14* (2006.01)

(52) U.S. Cl.
CPC ...................................... *H04L 27/14* (2013.01)
USPC .......................................... 375/346; 375/316

(58) Field of Classification Search
CPC ...... H04B 1/707; H04B 1/7117; H04B 1/123; H04B 1/7115; H04B 3/32; H04B 1/1027; H04L 27/2647; H04L 5/007; H04L 25/03343; H04L 5/03057; H04L 1/06; H04N 5/4401
USPC ......... 375/147–148, 260, 285, 316, 346–349; 1/147–148, 260, 285, 316, 346–349
See application file for complete search history.

(56) References Cited

U.S. PATENT DOCUMENTS

| | | | |
|---|---|---|---|
| 7,593,488 B2 * | 9/2009 | Furman et al. | 375/340 |
| 7,630,965 B1 | 12/2009 | Nieto | |
| 8,204,164 B1 | 6/2012 | Furman et al. | |
| 2008/0181323 A1 * | 7/2008 | Waters et al. | 375/260 |
| 2011/0021155 A1 * | 1/2011 | Ozaki et al. | 455/67.13 |
| 2011/0028109 A1 | 2/2011 | Nieto et al. | |
| 2011/0211646 A1 * | 9/2011 | Mashino et al. | 375/260 |

\* cited by examiner

*Primary Examiner* — Vineeta Panwalkar
*Assistant Examiner* — Janice Tieu
(74) *Attorney, Agent, or Firm* — Allen, Dyer, Doppelt, Milbrath & Gilchrist, P.A.

(57) ABSTRACT

A communications device includes a demodulator configured to demodulate a received communications signal into complex time domain samples. A processor is coupled to the demodulator and configured to determine the variance over time domain magnitude samples, perform a complex Fast Fourier Transform (cFFT) on the complex time domain samples as magnitude and phase to obtain frequency domain samples and determine the variance over the frequency domain samples. A comparator compares a variance ratio of the time domain magnitude samples and the frequency domain samples with a threshold to determine if a RF interferer is present, indicative that the communications channel is busy.

16 Claims, 10 Drawing Sheets

EXPECTED APPROXIMATE DETECTION THRESHOLD IN dB/Hz IN AWGN WITH ONE SECOND AVERAGING:

| SIGNAL TYPE | TIME-DOMAIN APPROACH | VARIANCE RATIO SOLUTION | GAIN (dB) |
|---|---|---|---|
| CW | 45 | 35 | 10 |
| SBPSK 1200 sps | 45 | 38 | 7 |
| SBPSK 2400 sps | 45 | 40 | 5 |
| SBPSK 9600 sps | 45 | 42 | 3 |
| 16K FSK | 46 | 44 | 2 |
| NB CPM 2400 sps | 45 | 39 | 6 |
| WB CPM 9600 sps | 45 | 44 | 1 |
| SCM 25K | 45 | 38 | 7 |

FIG. 6

COMMUNICATIONS DEVICE AND RELATED METHOD THAT DETECTS RADIO FREQUENCY (RF) INTERFERER ON A COMMUNICATIONS CHANNEL

FIELD OF THE INVENTION

The present invention relates to communications, and more particularly, the present invention relates to detecting a radio frequency (RF) interferer on a communications channel, for example, prior to radio transmission, to limit communications signal collisions as a form of channel avoidance.

BACKGROUND OF THE INVENTION

Many communication systems, both wired, e.g., Ethernet, and wireless, e.g., HF, VHF, or UHF, use a form of Carrier Sense Multiple Access (CSMA) to determine whether a radio frequency or communications channel is used by another station before using that frequency or channel. This technique does not work well in a noise- and interference-rich environment. To overcome this problem, some communications systems intersperse a training sequence into modem waveforms to assist in signal detection and channel tracking. In standard HF modem waveforms, however, signal detection is hampered by the use of heavily filtered Phase Shift Keyed (PSK) waveforms, e.g., M-PSK, which are difficult to distinguish from background noise and interference. Without a training sequence, the ability to determine the presence or absence of these waveforms is difficult.

Commonly assigned U.S. Pat. No. 7,593,488, the disclosure of which is hereby incorporated by reference in its entirety, addresses the problem of determining the presence or absence of a PSK signal without requiring a training sequence. That disclosed communications system collects a plurality of signal samples at a selected frequency for a known period of time, determines a metric dependent on at least one measured characteristic associated with the collected signal samples, and indicates signal status when the determined metric is greater than a known value. The signal status is indicated as absent when the determined metric is less than a known value. That system operates with time-domain samples and calculates the mean-square and variance of the magnitude when in-phase (I) and quadrature (Q) samples are received.

Some communications systems operate well when using the techniques disclosed by the '488 patent. Simultaneous transmission (collision) by radio systems that do not use some form of automatic repeat request (ARQ) or reception acknowledgement will typically fail. The radio user also has no visibility into this failure and would not be able to determine its cause. This technical problem is especially relevant in satellite communications. UHF military satellite communications (MILSATCOM) use frequency selective 5 kHz and 25 kHz channels that are filtered and hard-limited, allowing only a single transmission at a time. As a result, the technique described in the '488 patent does not operate well with MILSATCOM and similar communications systems. Line-of-sight (LOS) communications for FM voice, AM voice and all single frequency, non-spread spectrum communications have a similar limitation.

SUMMARY OF THE INVENTION

In accordance with non-limiting examples, a communications technique builds on the technique disclosed in the incorporated by reference '488 patent and calculates the variance in the time domain and calculates the variance in the frequency domain and then calculates the ratio of these two variances as time versus frequency for a sample set of an incoming signal to determine if there is a "channel busy condition," indicative of the presence of a radio frequency interferer.

A communications device includes an input configured to receive a communications signal over a communications channel. A demodulator is coupled to the input and configured to demodulate the received communications signal into complex time domain samples. A processor is coupled to the demodulator and configured to determine the variance over time domain magnitude samples, perform a complex Fast Fourier Transform (cFFT) on the complex time domain samples as magnitude and phase to obtain frequency domain samples and determine the variance over the frequency domain samples. A comparator is configured to compare a variance ratio of the variance in the time domain magnitude samples and the variance in the frequency domain samples with the threshold to determine if a RF interferer is present, indicative that the communications channel is busy.

In one example, the demodulator is configured to demodulate the received communications signal into in-phase (I) and quadrature (Q) signal components. In another example, a vector magnitude determinator is configured to receive I and Q signal components and determine complex time domain samples as magnitude and phase. A normalizing circuit may be configured to normalize all time domain magnitude samples to a fractional amplitude value. In another example, the processor is configured to determine the mean over the time domain magnitude samples before determining the variance. In specific examples, a variance ratio below the threshold is indicative that the RF interferer signal is present and a variance ratio of one is indicative of noise on the communications channel without a RF interferer signal. A variance ratio below one is indicative of a RF interferer signal on the communications channel.

In another example, the communications device includes a wireless transceiver configured to transmit and receive communications signals over a communications channel. When the comparator determines that a RF interferer is present, indicative that the communications channel is busy, the wireless transceiver will not transmit a communications signal over the communications channel.

A method aspect is also disclosed.

BRIEF DESCRIPTION OF THE DRAWINGS

Other objects, features and advantages of the present invention will become apparent from the detailed description of the invention which follows, when considered in light of the accompanying drawings in which:

FIG. 6 is a chart showing the expected approximate detection threshold in dB/Hz in additive white Gaussian noise (AWGN) with one second averages in accordance with a non-limiting example.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

It should be appreciated by one skilled in the art that the system, communications device, methodology and techniques as described are not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication and satellite communications. Applications may involve point-to-point communication, point-to-multipoint communication, broadcasting, cellular networks and other wireless networks.

As noted before, the techniques described by the incorporated by reference, commonly assigned '488 patent, collects signal samples at a selected frequency for a known period of time and determines a metric that is dependent upon at least one measured characteristic. That prior art system is described with reference to FIG. 1 and indicates signal status as present when the determined metric is greater than a known value and indicates the signal status as absent when the determined metric is less than a known value.

Figure 1:
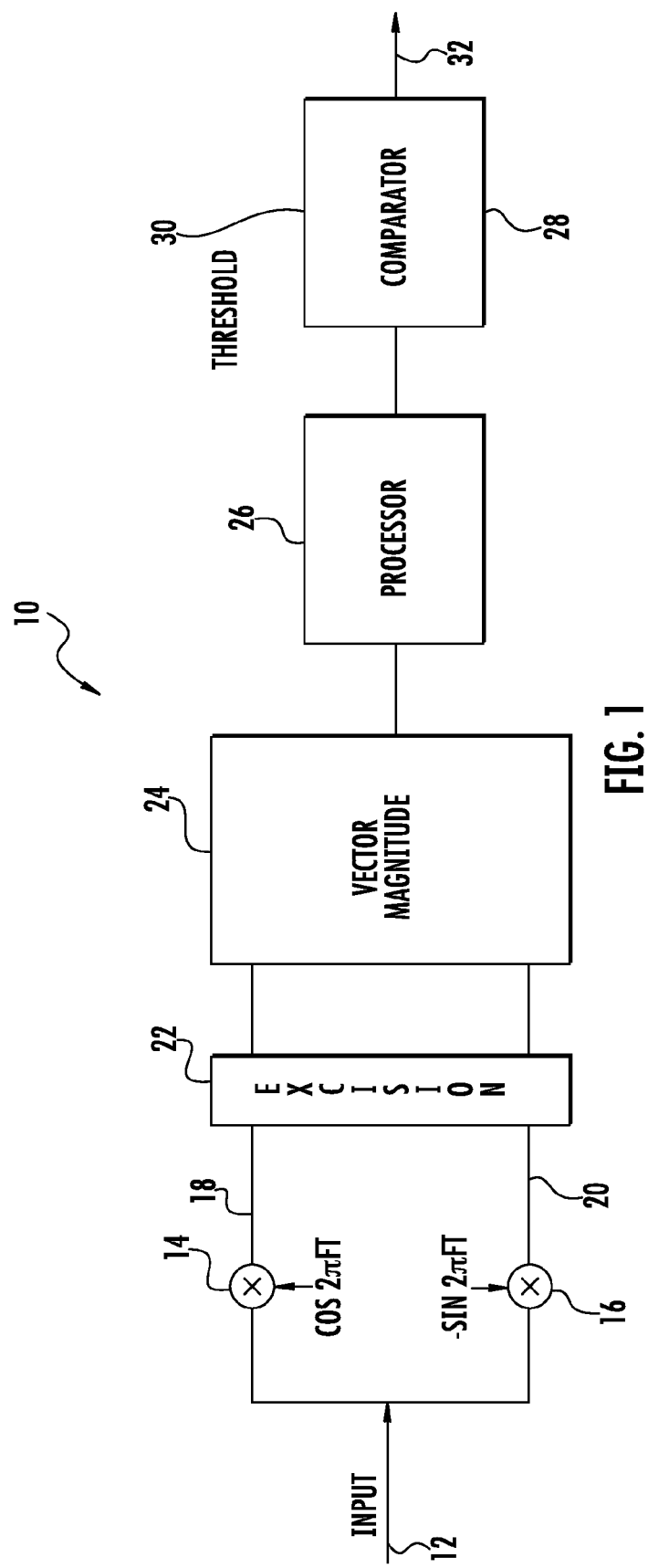
FIG. 1 illustrates a block diagram of a prior art circuit as described in the incorporated by reference '488 patent, used to determine if a RF interferer signal is present.

FIG. 1 illustrates a prior art block diagram of an exemplary PSK receiving system 10 in accordance with the system and method described in the '488 patent. In this exemplary system, a digital signal 12 is conventionally applied to multipliers 14, 16, which demodulate the digital signal 12 into an in-phase (I) and quadrature phase (Q) component, 18, 20, respectively. The demodulated components are optionally applied to excision circuit 22 to remove any narrowband signal, e.g., tone jammer, that may be superimposed on signal 12. The demodulated signals are then applied to a vector magnitude determinator circuit 24, which determines signal vector magnitude values as complex values, i.e., magnitude and phase. For example, the real magnitude may be determined as the square root of the sum of the squares of the in-phase 18 and quadrature phase 20 components of the signal.

The vector magnitudes are then applied to the processor 26 to determine characteristics of the received signal over a known period of time. These determined characteristics include the mean and variance of the real magnitude of the complex value associated with the collected sample. Processor 26 is further operable to determine a metric value associated with the determined characteristics. The determined metric is then applied to comparator 28 concurrently with a known threshold value 30. An indication 32 of signal presence occurs when the determined metric value is greater than the known threshold. Otherwise, an indication of no signal detected is provided.

The flowcharts in the '488 patent explain in greater detail the processing associated with the disclosed system. These flowcharts are not reproduced but the overall operating process for detecting a RF interferer using that prior art technique is explained below.

A preferred first characteristic value is determined as a real magnitude of the complex magnitude, i.e., amplitude, associated with the signals received during a known time period. A mean value of the complex vector amplitudes associated with the collected signal samples may be determined in Equation 1 below as:

$$\overline{A} = \frac{\sum_{n=1}^{N} A_n}{N}$$

A first sample is obtained and the amplitude associated with that sample is added to an accumulated sum of amplitudes. A determination is made whether more samples are available. If the answer is in the affirmative, then a next sample is obtained and processing continues. However, if the answer is in the negative, then a mean value is determined in accordance with Equation 1 above.

A preferred variance value of the amplitudes associated with the signals received during a known time period is also established. A variance value of the complex vector amplitudes associated with the collected signal samples may be determined in Equation 2 as:

$$V = \frac{\sum_{n=1}^{N} A_n^2}{N} - \left(\frac{\sum_{n=1}^{N} A_n}{N}\right)^2$$

for $$N \gg 1$$

or more specifically in Equation 3 as:

$$V = \frac{\sum_{n=1}^{N}(A_n - \overline{A})^2}{N}$$

A first sample is obtained. The amplitude associated with that sample is squared and added to an accumulated sum of vector magnitudes. A determination is made whether more samples are needed. If the answer is in the affirmative, then a next sample is obtained and processing continues.

If the answer is false, however, then an average value of the squares of the vector magnitudes or amplitude values is determined. A mean value of the collected amplitudes is determined, similar to the process described above. A variance value, in accordance with Equation 2, is then determined.

The received data samples are collected over a known period of time. In one example, the period is preferably 450 milliseconds. In a second example, the period is 900 milliseconds. Any time period that provides for sufficient data sample collection, however, may be selected.

A performance metric may be determined in relation to the first and second measured characteristic, in the preferred mean and variance, as:

$$m = \frac{\overline{A}^2}{V}$$

where m is the metric value;
$\overline{A}$ is the mean value; and
V is the variance.

In this case, the ratio shown in Equation 3 above provides an indication of dispersion of the received demodulated samples in an IQ vector space. A low dispersion value indicates the received signal resembles a PSK signal received with an unknown sub-carrier frequency offset.

A determination is made whether the determined metric is greater than a known threshold value. If the answer is not, processing stops. If the answer is affirmative, however, the signal status is deemed present.

This technique as described in the '488 patent is advantageous in some communication systems, but suffers technical drawbacks when used with satellite and other communications. UHF military satellite communications (MILSAT-COM), for example, use frequency selective channels that are filtered and hard-limited and only allow a single transmission at a time. The line-of-sight (LOS) communications for FM voice, AM voice and many single-frequency, non-spread spectrum communications have the same limitation. Simultaneous transmission and collision by radio systems that do not use a form of ARQ or reception acknowledgement fail and the radio operator will have no visibility into that failure.

A user could be transmitting in a satellite communications channel and using encrypted data, for example, but there could be 50 different transmissions in that same satellite channel, all having different modulation types. If a first user is communicating with 16K FSK voice and a second user desires to communicate with 56K CPM, and that second user begins transmission, then the second signal transmission would transmit over the first signal transmission and both users would lose the ability to communicate. Even if one user is operating on AM and the other user is operating on FM, when one user transmits over the other, communication would still be difficult. This problem occurs for line-of-sight (LOS). AM is not transmitted through a hard-limited (SAT-COM) channel because amplitude information is destroyed by a hard-limiter.

The techniques described above for the commonly assigned '488 incorporated by reference patent calculate the mean and variance of the magnitude of the signal, where the magnitude is the square root of the sums of the squares of the signal input. The mean is obtained and a variance calculated. If the system is receiving noise, that variance is actually a noise power.

As noted before, that technique does not operate well with many satellite and similar communications that have hard-limited channels and associated signals that have similar variances. When data is converted to the frequency domain, the white Gaussian noise is flat and the variance is small. When a carrier is transmitted in the frequency domain, there is a spike in the middle of the frequency, as evident when the complex Fast Fourier Transform is taken. For example, CW has a higher variance than noise and would be evident in this example.

In accordance with a non-limiting example, the variance of the time domain and the variance in the frequency domain are both calculated and a ratio of both is used to determine if there is a RF interferer signal and declare the channel busy. This new technique to an extent follows the definition of additive white Gaussian noise (AWGN) such that the variance as a noise power is the same in both the time-domain and frequency-domain with an adjustment for scaling due to the conversion to the frequency-domain. Any signal in real world operating conditions, however, would not have the same variance in the time-domain and frequency-domain. In accordance with a non-limiting example, the decision whether a RF interferer is present can be based on the ratio of the two variances as time versus frequency for a sample set of the incoming signal. This solution works for known satellite communications signals such as CPM, PSK, FSK, and other similar signals. It will also work in line-of-sight to detect CW, FM, AM, and similar signals.

Figure 2A:
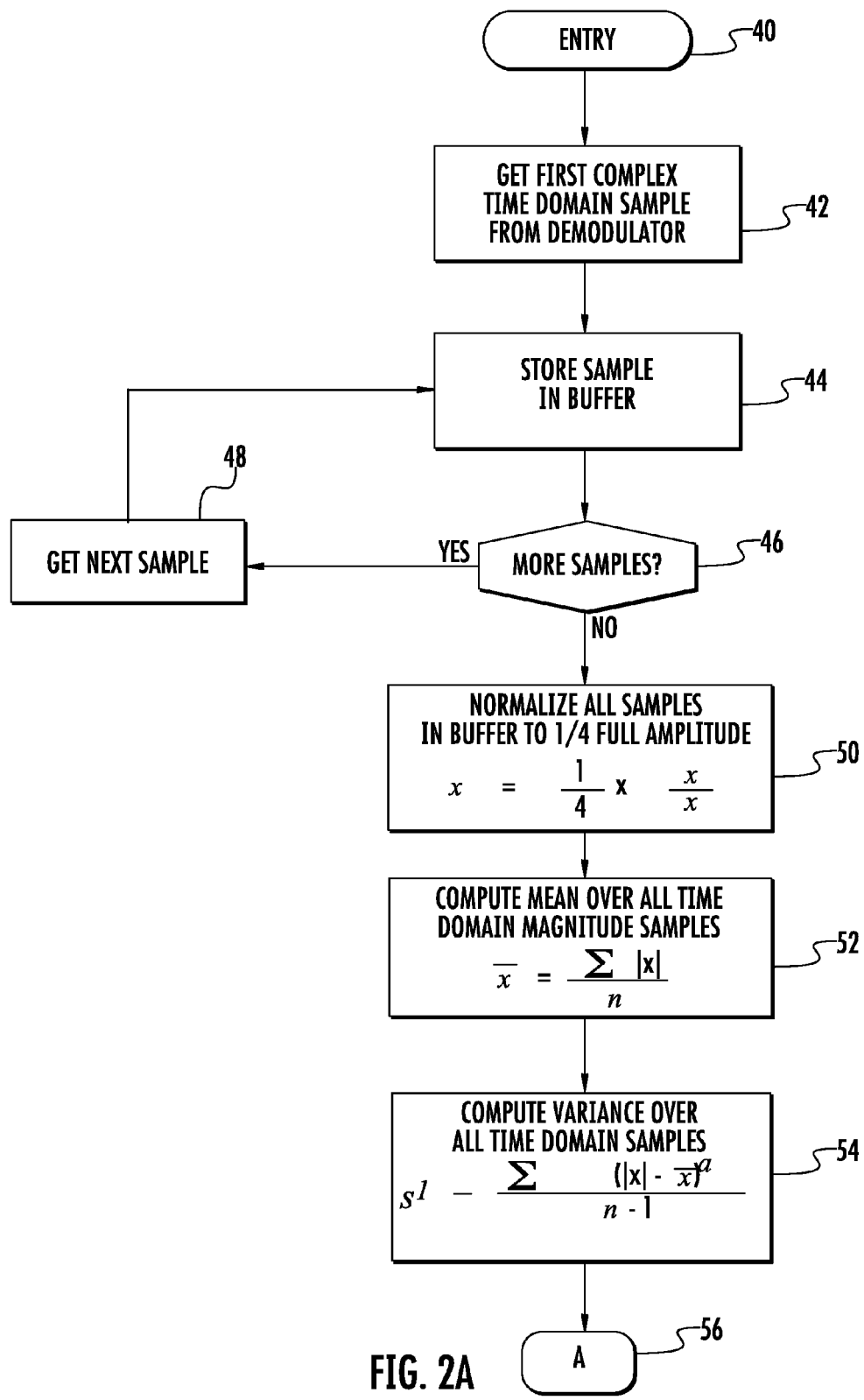
FIGS. 2A and 2B are flowcharts illustrating an example process used to determine whether a RF interferer is present and the channel busy in accordance with a non-limiting example of the present invention.
Figure 2B:
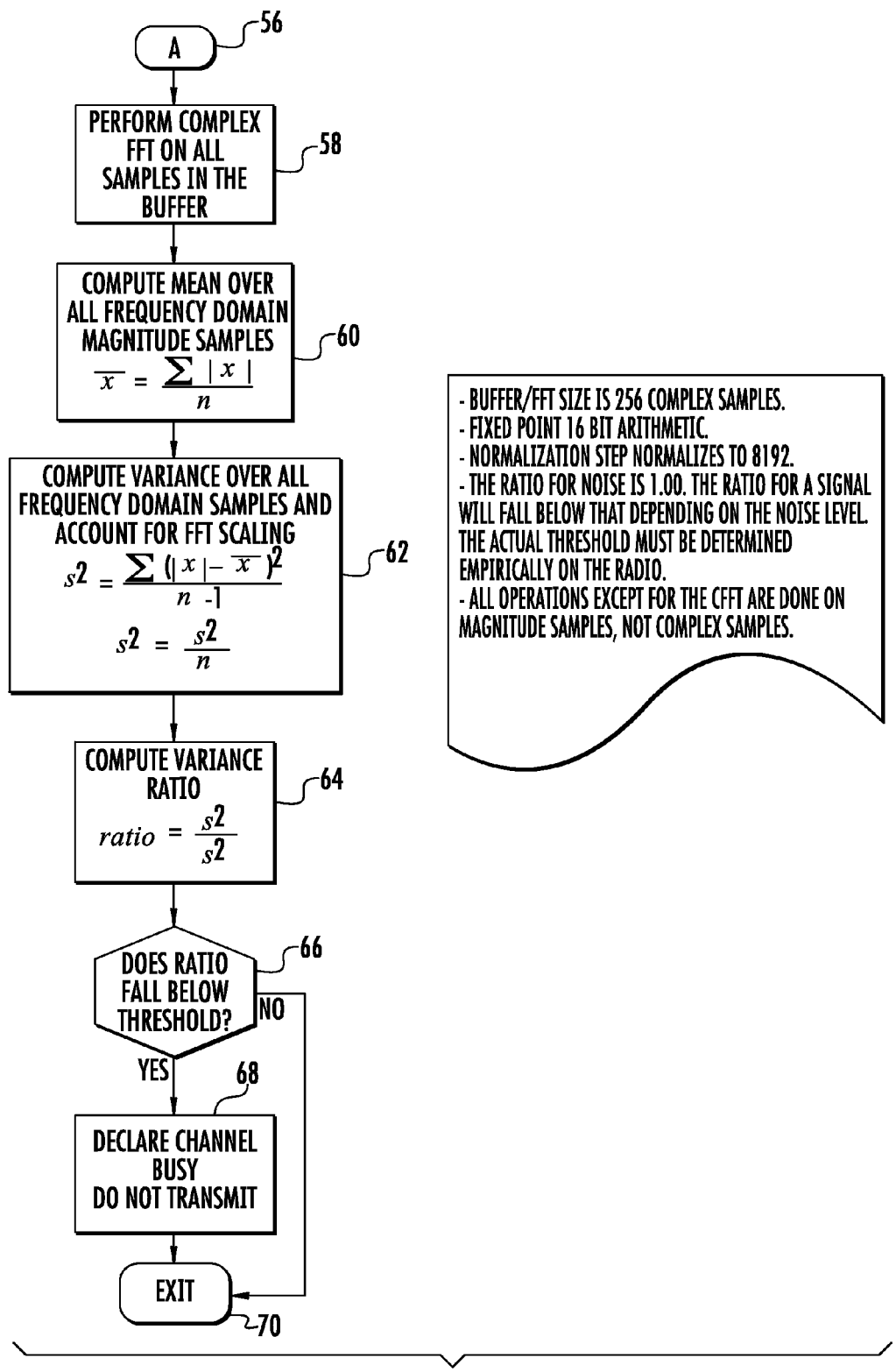

FIGS. 2A and 2B are flowcharts showing a sequence of steps that can be used by a communications device to calculate the variance ratio and determine if the channel is busy, in accordance with a non-limiting example. Data is input at block 40 and a first complex time domain sample is obtained from the demodulator at block 42. Typically, a receiver such as a wireless receiver is configured to receive the communications signal over the communications channel. A demodulator is configured to demodulate the received communications signal into in-phase (I) and quadrature (Q) signal components that are then processed into complex time domain samples, for example, through use of a vector magnitude determinator that is configured to receive the I and Q signal components and determine the complex time domain samples as magnitude and phase. The sample is stored in a buffer at block 44 and a determination is made if more samples are required at block 46. If yes, then the next sample is obtained at block 48 and that sample stored in the buffer at block 44 again. If more samples are not required, then all samples are normalized in the buffer using a normalizing circuit to one-fourth of the full amplitude as shown at block 50.

The mean is computed over all time domain magnitude samples at block 52. The variance is then computed over all time domain samples at block 54. The process continues as indicated by the circle legend A at block 56 in FIG. 2B in which a complex Fast Fourier Transform (cFFT) is performed on all samples in the buffer at block 58. The mean is then computed over all frequency domain magnitude samples at block 60. The variance is computed over all frequency domain samples at block 62, accounting for FFT scaling. A variance ratio is computed at block 64 and a determination is made at block 66 if the ratio falls below a threshold. If the ratio falls below the threshold, the channel is declared busy at block 68 and the process ends and exits at block 70. The communications device in an example does not "key down" or transmit if the channel is busy. If the ratio does not fall below the threshold at block 66, the process still ends. Although the key line may be inhibited with some radios (communications devices), the key line may not be inhibited with other communications devices, this system is not limited to automatic key line inhibit. The radio operator may have to monitor the BUSY/NOT BUSY status of the radio and adjust protocol based on channel status, in an example.

In this process, the buffer/FFT size is typically 256 complex samples and fixed point 16-bit arithmetic is used. The normalization step normalizes to 8192 that represents 0.25. If the ratio for noise is 1.00 as indicated by 32767 in 16-bit arithmetic, the ratio for a signal will fall below that depending on the noise level. The actual threshold is determined empirically on the communications device as the radio. All mathematical and logic operations, except for the complex FFT, are accomplished on magnitude samples and not the complex samples.

The process described above can be summarized as an improved technique over the incorporated by reference '488 patent for detecting a radio frequency (RF) interferer on a communications channel for Line-of-Sight and satellite communications. The communications signal as described above is received within a receiver and demodulated to obtain the complex time domain samples, which is typically performed by obtaining the in-phase (I) and quadrature (Q) signal components and processing those components to obtain the plurality of complex time domain samples as magnitude and phase. The variance over the time domain magnitude samples is determined followed by performing the complex Fast Fourier Transform (cFFT) on the complex time domain samples as magnitude and phase to obtain the frequency domain samples. The variance is determined over the frequency domain samples and the variance ratio compared with the threshold to determine if a RF interferer is present, indicative that the communications channel is busy.

A variance ratio below the threshold is indicative that the RF interferer is present and in one example, a variance ratio of one is indicative of noise on the communications channel without a RF interferer signal. A variance ratio below one is typically indicative of a RF interferer signal on the communications channel. The RF interferer typically indicates a communications signal transmitted from a second communications device.

Figure 3:
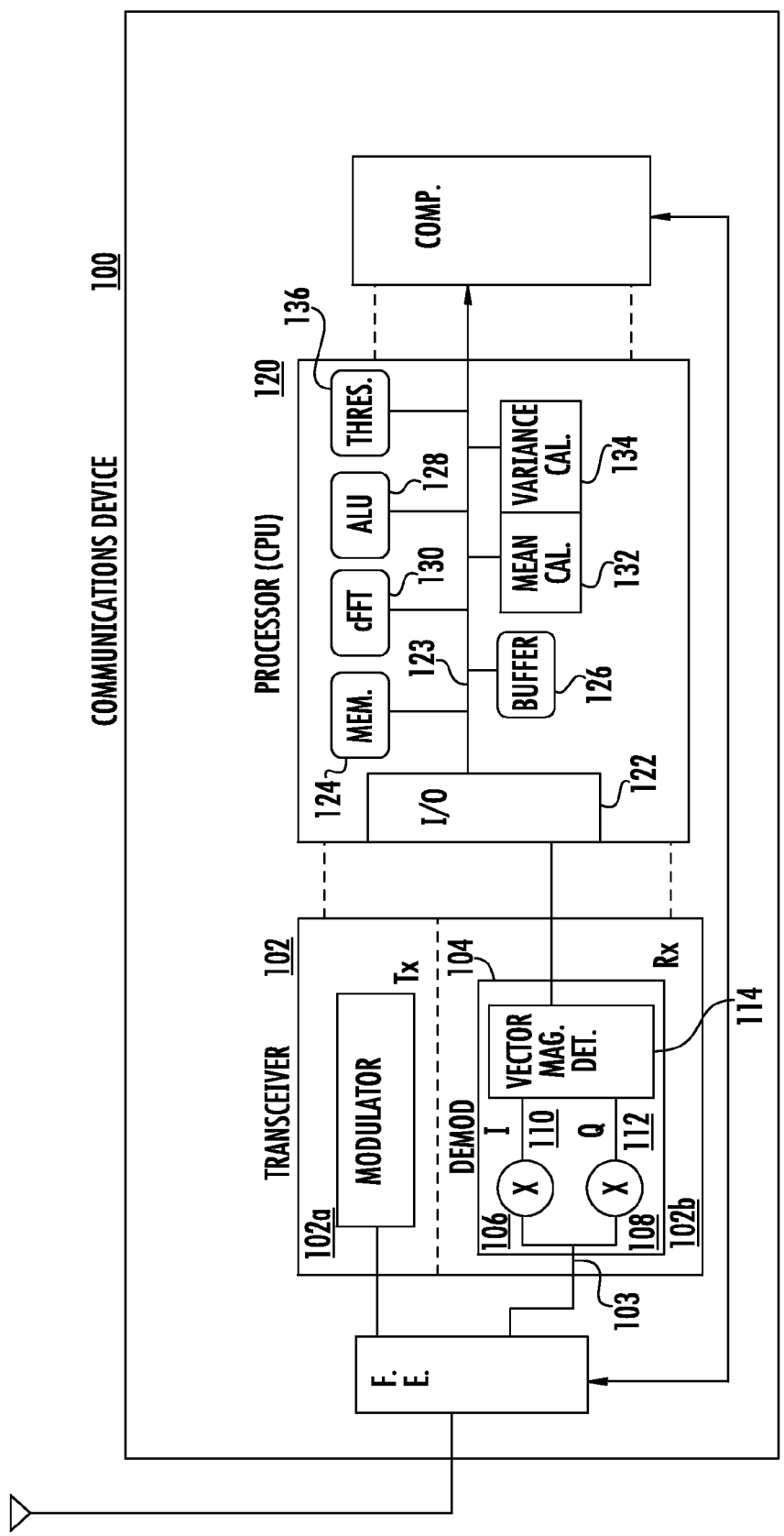
FIG. 3 is a block diagram showing an example of a communications device that can execute the processing steps shown in FIGS. 2A and 2B in accordance with a non-limiting example.

An example communications device is illustrated in FIG. 3 at 100 and includes a front end circuit 101 and a transceiver 102 that can operate as a wired or wireless transceiver and includes transmitter and receiver modules 102a, 102b and other basic components associated with normal transceiver circuits. A communications signal, for example, a wireless communications signal, is received over a communications channel into the transceiver 102 at a receiver input 103. A demodulator 104 is coupled to the receiver input 103 and configured to demodulate the received communications signal into complex time domain samples having magnitude and phase. The demodulator 104 includes mixers 106, 108 that receive a split communications signal from the transceiver 102 and demodulates the signal to form in-phase (I) and quadrature (Q) signal components 110, 112, which are subsequently processed in a vector magnitude determinator circuit 114 to determine complex time domain samples as the magnitude and phase. This vector magnitude determinator circuit 114 can be an integral part of the demodulator as in the preferred embodiment or a separate processing component, operating in conjunction with the demodulator. A processor as a central processing unit (CPU) 120 includes basic components of an input/output circuit 122 and a communications bus 123 that interoperates with various components including a memory 124, buffer 126, arithmetic logic unit (ALU) 128, complex Fast Fourier Transform (cFFT) circuit 130, mean calculating circuit 132, variance calculating circuit 134 and threshold calculator circuit 136. The processor 124 determines the variance over the time domain magnitude samples, performs the complex Fast Fourier Transform on the complex time domain samples as magnitude and phase to obtain the frequency domain samples and determines the variance over the frequency domain samples. The comparator 138 compares the variance ratio of the time domain magnitude samples and the frequency domain samples with the threshold to determine if a RF interferer is present, indicative that the communications channel is busy. The results from the comparator 138 are transmitted back to the transceiver 102 as illustrated. If the channel is busy, the transceiver typically would not communicate on that communications channel. If the comparator 138 indicates that the RF interferer is not present and only noise, then communications can occur.

The communications device and system as described in accordance with a non-limiting example has various advantages. Time-domain-only methods and their solutions as described above with a time versus frequency variance ratio work for any signal type including on a hard-limited channel and produces a constant reference for received noise power. A fixed threshold can be set for any signal type. The detection performance of the technique as described is improved by 1-10 dB depending on the signal type over the time-domain method, assuming a detection threshold of about 90% of a normalized AWGN case. The performance gain of this technique increases with signals having a relatively narrower bandwidth because the frequency variance is greater with a narrower bandwidth. Disadvantages of the technique may be an increased computational complexity with the addition of a FFT and a second variance calculation in comparison to a time-domain-only technique such as described with the incorporated by reference '488 patent. Loading could be reduced by increasing the interval of the blocks of samples that are processed for detection. Also, not all available in-phase and quadrature samples could be processed with this improved technique. With this type of processing to determine when a channel is busy, a question arises how often a user needs to know if the channel is being used. The greater number of times a user must know if a channel is used, i.e., "channel busy," would increase the overall processing. Variance ratios can be determined by those skilled in the art with the particular requirements of the radio communication and depending on the environment.

Figure 4:
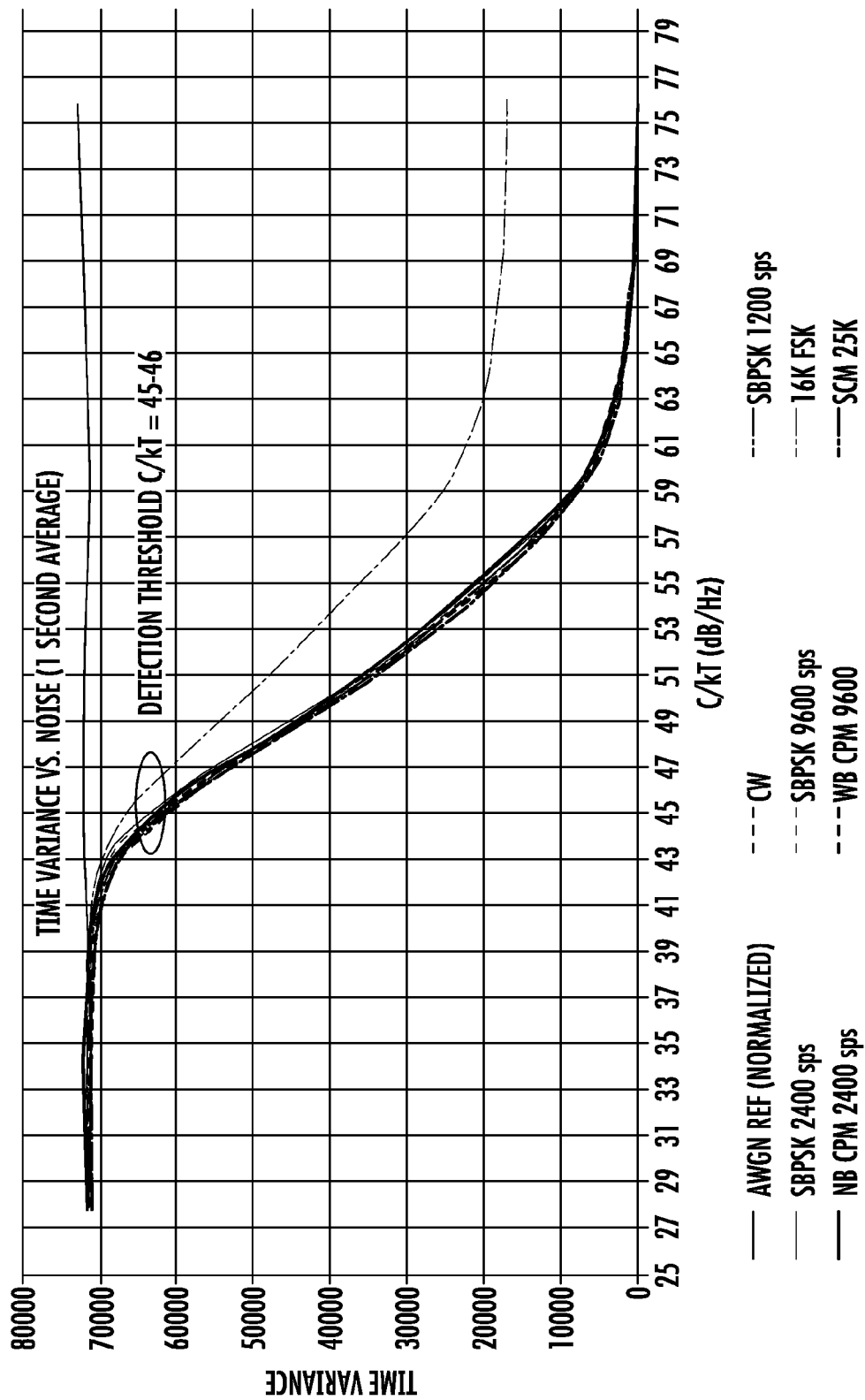
FIG. 4 is a graph showing the time variance versus noise in accordance with a non-limiting example.
Figure 5:
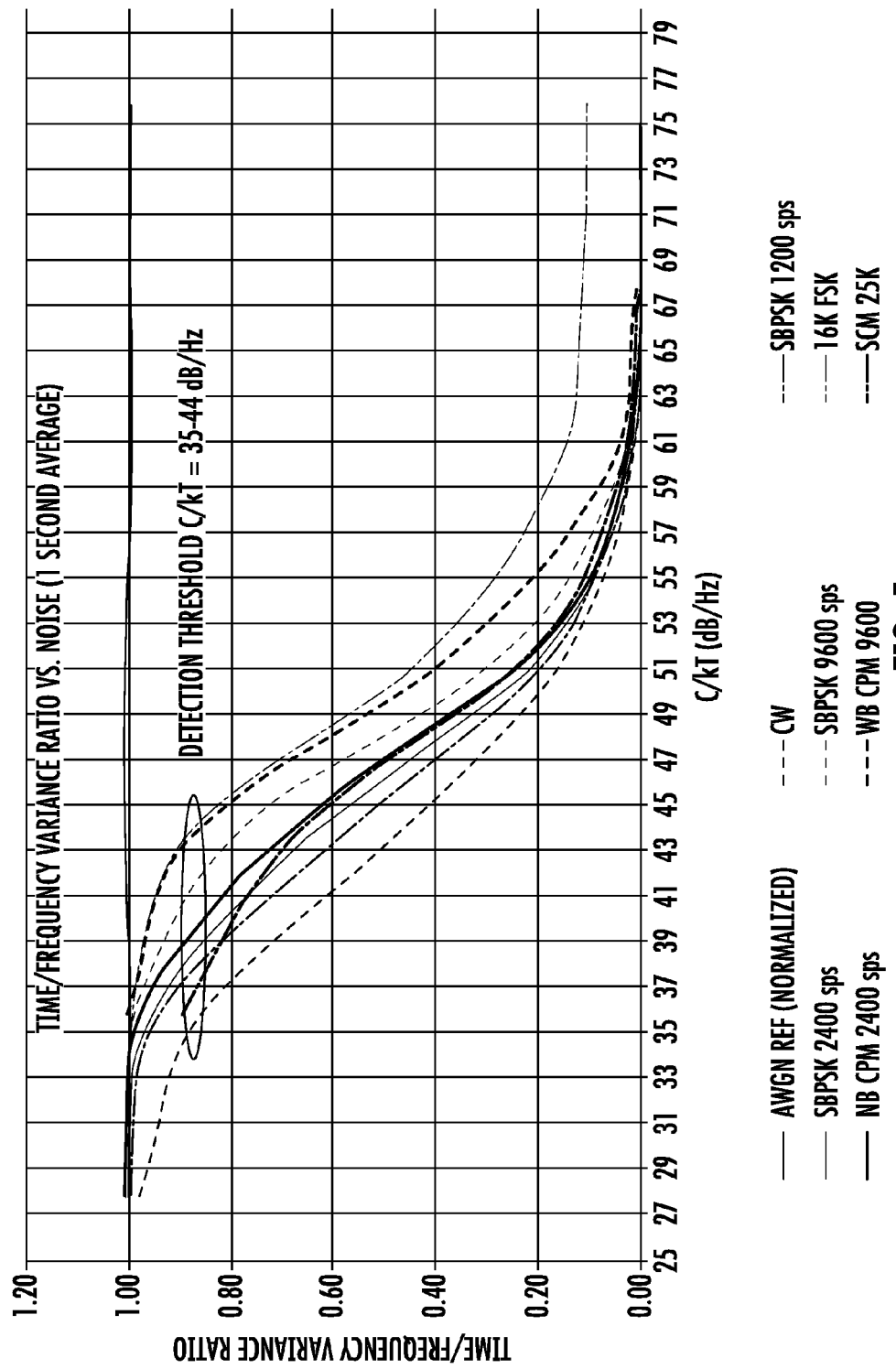
FIG. 5 is a graph showing the time/frequency variance ratio versus noise in accordance with a non-limiting example.

FIG. 4 is a graph showing the time variance versus noise for a one-second average and showing the detection threshold C/KT=45-46 and showing the results for different types of signals. It shows the system is substantially limited and works with various shaped binary waveforms, including a shaped binary (2-ary) waveform and unshaped (1REC) quaternary (4-ary) CPM modulation types. Similar advantages are shown by the graph in FIG. 5 that shows the time/frequency variance ratio versus the noise of the one-second average. There is an expected approximate detection threshold and dB/Hz with the AWGN with one-second averaging as shown in the chart of FIG. 6. The signal type is illustrated with the representative numbers for the time-domain approach and the variance ratio solution in accordance with a non-limiting example and showing the respective gain.

The new technique as described advantageously works with advanced special communications modes to overcome the obstacles to allow error free communications in a jammed environment. It reliably detects multiple modulation types over the range of typical SATCOM channel conditions and works with both SATCOM and LOS channels. This technique does not rely on the knowledge of the modulation scheme or any fixed pattern within the modulated data and is applicable to cognitive radio receiver systems.

For purposes of description, some background information on coding, interleaving, and an exemplary wireless, mobile radio communications system that includes ad-hoc capability and can be modified for use is set forth. This example of a communications system that can be used and modified for use with the present invention is now set forth with regard to FIGS. 7-9.

An example of a radio that could be used with such system and method is the software defined Falcon™ III Manpack radio manufactured and sold by Harris Corporation of Melbourne, Fla. This type of radio can support multiple bandwidths from 30 MHz up to 2 GHz, including L-band SATCOM and MANET. The waveforms can provide secure IP data networking. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification, which is hereby incorporated by reference in its entirety. The SCA is an open architecture framework that specifies how hardware and software components are to interoperate so that different manufacturers and developers can readily integrate the respective components into a single device.

The Joint Tactical. Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

Figure 7:
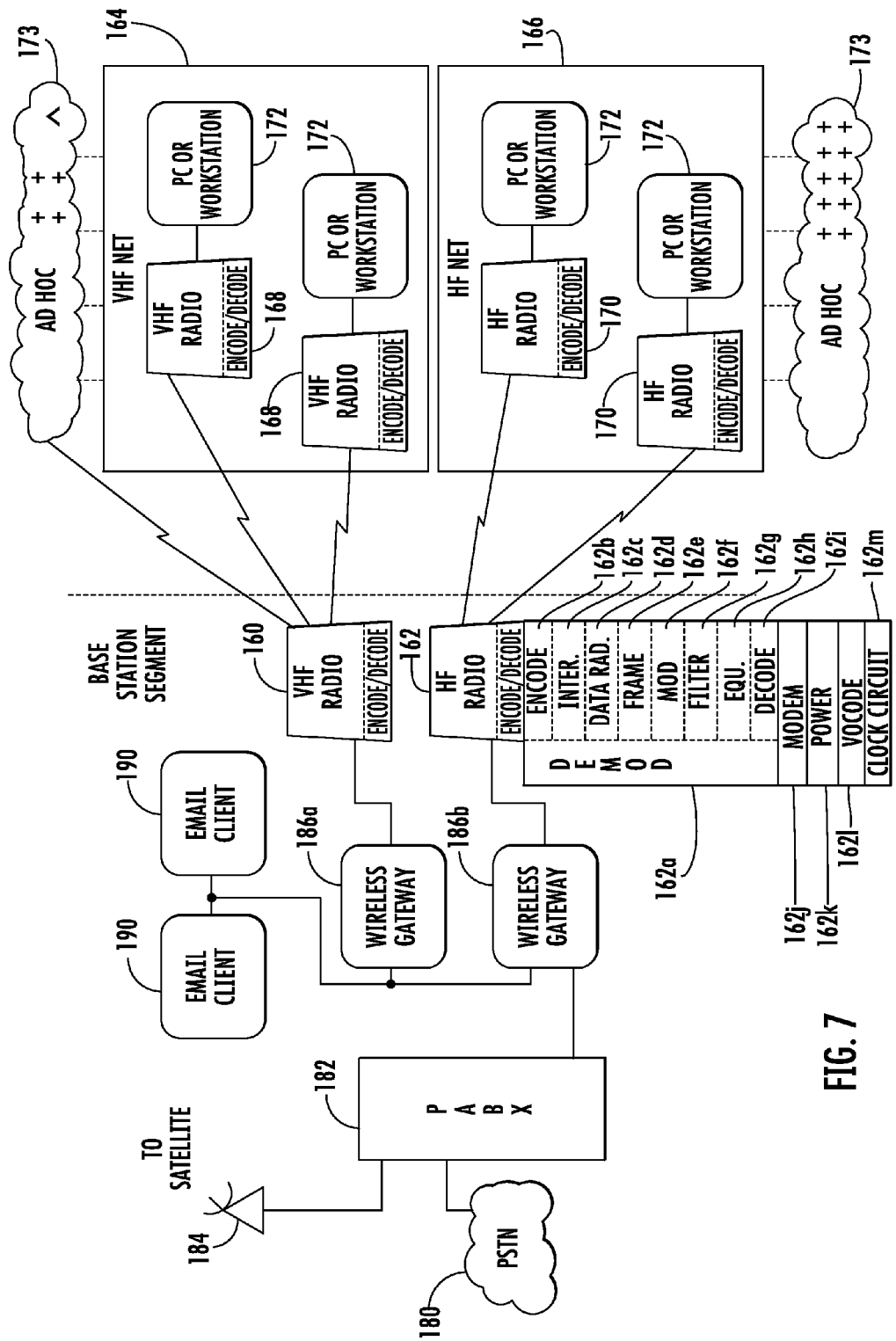
FIG. 7 is a block diagram of an example of a communications system showing a number of communications devices and other communications components that can be used in accordance with a non-limiting example.

For purposes of description only, a brief description of an example of a communications system that includes communications devices is described relative to a non-limiting example shown in FIG. 7. This high-level block diagram of a communications system includes a base station segment and wireless message terminals that could be modified for use with the present invention. The base station segment includes a VHF radio 160 and HF radio 162 that communicate and transmit voice or data over a wireless link to a VHF net 164 or HF net 166, each which include a number of respective VHF radios 168 and HF radios 170, and personal computer workstations 172 connected to the radios 168, 170. Ad-hoc communication networks 173 are interoperative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF and higher frequency radios and net segments are not illustrated, these could be included.

The radio can include a demodulator circuit 162a and appropriate convolutional encoder circuit 162b, block interleaver 162c, data randomizer circuit 162d, data and framing circuit 162e, modulation circuit 162f, matched filter circuit 162g, block or symbol equalizer circuit 162h with an appropriate clamping device, deinterleaver and decoder circuit 162i modem 162j, and power adaptation circuit 162k as non-limiting examples. A vocoder circuit 162l can incorporate the decode and encode functions and a conversion unit could be a combination of the various circuits as described or a separate circuit. A clock circuit 162m can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 30 MHz to about 2 GHz as non-limiting examples.

The base station segment includes a landline connection to a public switched telephone network (PSTN) 180, which connects to a PABX 182. A satellite interface 184, such as a satellite ground station, connects to the PABX 182, which connects to processors forming wireless gateways 186a, 186b. These interconnect to the VHF radio 160 or HF radio 162, respectively. The processors are connected through a local area network to the PABX 182 and e-mail clients 190. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 or higher bps with a radio set to ISB mode and an HF modem set to a fixed data rate. It is possible to use code combining techniques and ARQ.

Figure 8:
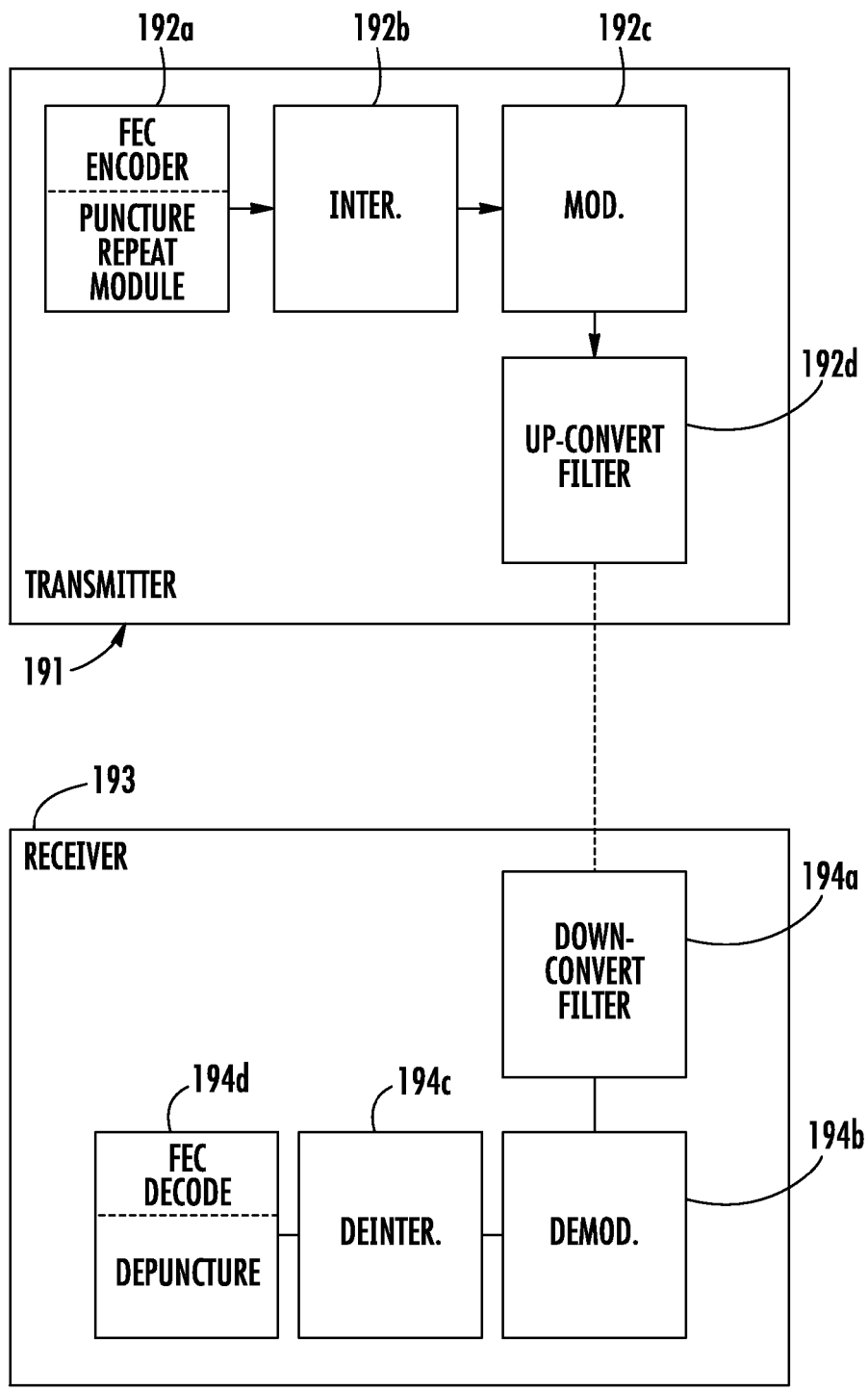
FIG. 8 is a high-level block diagram of a communications device showing basic components that can be used in accordance with a non-limiting example.

A communications system that incorporates communications devices can be used in accordance with non-limiting examples of the present invention and is shown in FIG. 8. A transmitter is shown at 191 and includes basic functional circuit components or modules, including a forward error correction encoder 192a that includes a puncturing module, which could be integral to the encoder or a separate module. The decoder 192a and its puncturing module includes a function for repeating as will be explained below. Encoded data is interleaved at an interleaver 192b, for example, a block interleaver, and in many cases modulated at modulator 192c. This modulator can map the communications data into different symbols based on a specific mapping algorithm to form a communications signal. For example, it could form Minimum Shift Keying or Gaussian Minimum Shift Keying (MSK or GMSK) symbols. Other types of modulation could be used in accordance with non-limiting examples of the present invention. Up-conversion and filtering occurs at an up-converter and filter 192d, which could be formed as an integrated module or separate modules. Communications signals are transmitted, for example, wirelessly to receiver 193.

At the receiver 193, down conversion and filtering occurs at a down converter and filter 194a, which could be integrated or separate modules. The signal is demodulated at demodulator 194b and deinterleaved at deinterleaver 194c. The deinterleaved data (i.e. bit soft decisions) is decoded and depunctured (for punctured codes), combined (for repeated codes) and passed through (for standard codes) at decoder 194d, which could include a separate or integrated depuncturing module. The system, apparatus and method can use different modules and different functions. These components as described could typically be contained within one transceiver.

It should be understood, in one non-limiting aspect of the present invention, a rate 1/2, K=7 convolutional code can be used as an industry standard code for forward error correction (FEC) during encoding. For purposes of understanding, a more detailed description of basic components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters can range from 1 to 8, m can range from 2 to 10, and the code rate can range from 1/8 to 7/8 in non-limiting examples. Sometimes convolutional code chips are specified by parameters (n, k, L) with L equal to the constraint length of the code as L=k (m−1). Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate 1/2 code is used, the transmission of a subset of the output bits of the encoder can convert the rate 1/2 code into a rate 2/3 code. Thus, one hardware circuit or module can produce codes of different rates. Punctured codes allow rates to be changed dynamically through software or hardware depending on channel conditions, such as rain or other channel impairing conditions.

An encoder for a convolutional code typically uses a look-up table for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, also referred to as Viterbi decoding, which typically is more desirable. Sequential decoding allows both forward and backward movement through the trellis. Viterbi decoding as maximum likelihood decoding examines a receive sequence of given length, computes a metric for each path, and makes a decision based on the metric.

Puncturing convolutional codes is a common practice in some systems and is used in accordance with non-limiting examples of the present invention. It should be understood that in some examples a punctured convolutional code is a higher rate code obtained by the periodic elimination of specific code bits from the output of a low rate encoder. Punctured convolutional code performance can be degraded compared with original codes, but typically the coding rate increases.

Some of the basic components that could be used as non-limiting examples of the present invention include a transmitter that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio transceiver as described above. For example if the constraint length of the convolutional code is 7, the encoder and Viterbi decoder could support selectable code rates of 1/2, 2/3, 3/4, 4/5, 5/6, 6/7, 7/8 using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate ½ code.

The Viterbi decoder parameters could include the convolutional code rate as a ratio of input to output bits for the convolutional encoder. The puncture rate could be the ratio of input to output bits for the convolutional encoder using a puncturing process and can be derived from a rate ½ mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

It should also be understood that the present invention is not limited to convolutional codes and similar FEC, but also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

Figure 9:
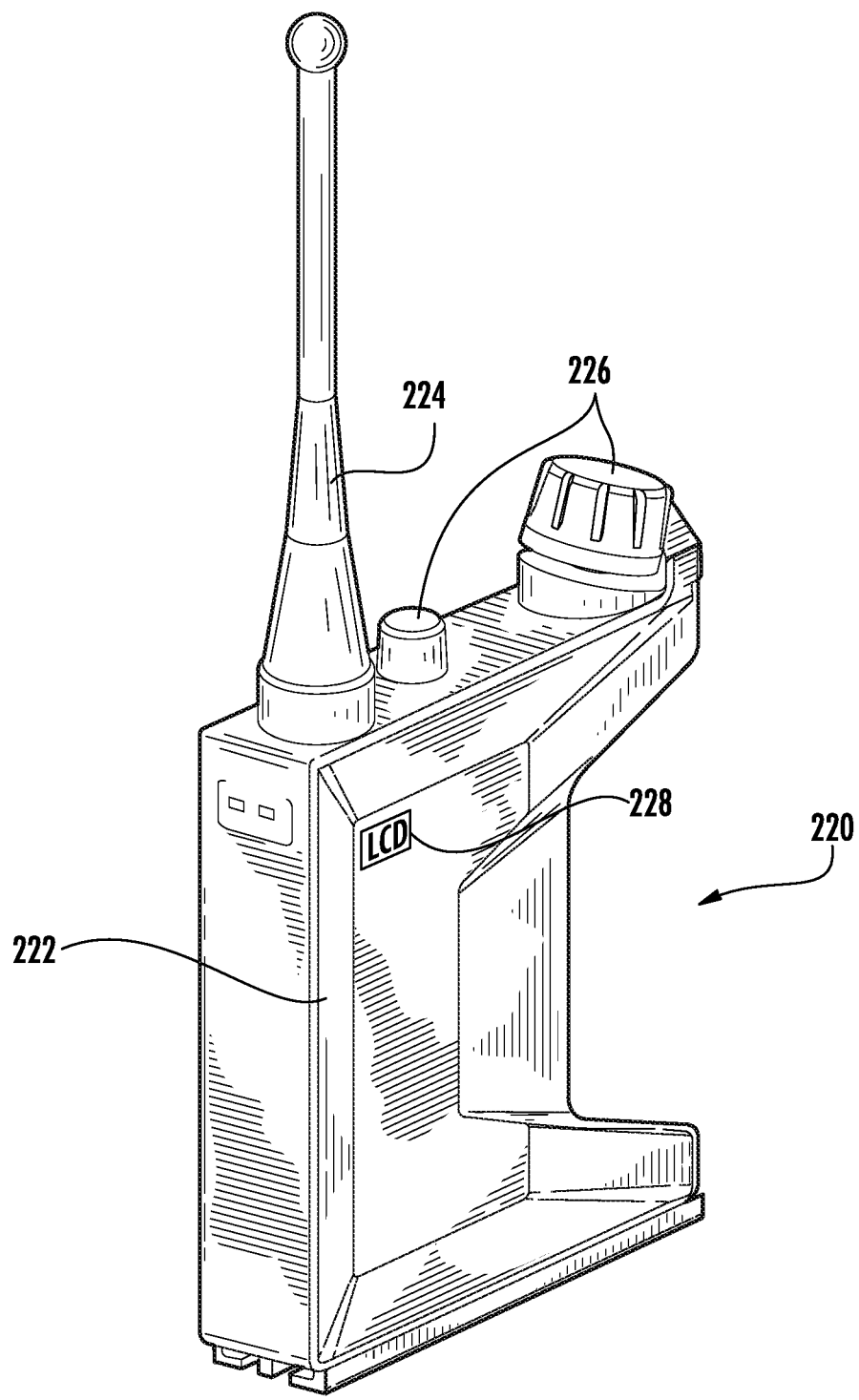
FIG. 9 is a perspective view of a portable wireless communications device as a handheld radio that could incorporate the communications methodology as described relative to FIG. 2A through FIG. 6 in accordance with a non-limiting example.

The system and method, in accordance with non-limiting examples of the present invention, can be used in multiprocessor embedded systems and related methods and also used for any type of radio software communications architecture as used on mainframe computers or small computers, including laptops with an added transceiver, such as used by military and civilian applications, or in a portable wireless communications device 220 as illustrated in FIG. 9. The portable wireless communications device as a radio can include a transceiver as an internal component and handheld housing 222 with an antenna 224 and control knobs 226. A Liquid Crystal Display (LCD) 228 or similar display can be positioned on the housing in an appropriate location for display. The various internal components, including dual processor systems for red and black subsystems and software that is conforming with SCA, is operative with the radio. Although a portable or handheld radio is disclosed, the architecture as described can be used with any processor system operative with the transceiver in accordance with non-limiting examples of the present invention. An example of a communications device that could incorporate the system and method, in accordance with non-limiting examples of the present invention, is the Falcon® III manpack or tactical radio platform manufactured by Harris Corporation of Melbourne, Fla.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device, comprising:
    an input configured to receive a communications signal over a communications channel;
    a demodulator coupled to the input and configured to demodulate the received communications signal into complex time domain samples;
    a processor coupled to the demodulator and having a buffer and configured to:
        normalize all complex time domain samples within the buffer to fractional amplitude values,
        determine the variance over time domain magnitude samples based on a computed mean over all normalized time domain samples,
        perform a complex Fast Fourier Transform (CFFT) on all complex time domain samples as magnitude and phase to obtain frequency domain samples, and
        determine the variance over all frequency domain samples based on a computed mean over all frequency domain magnitude samples; and
    a comparator configured to compare a variance ratio of the variance in the time domain magnitude samples and the variance in the frequency domain samples with a threshold to determine if a radio frequency (RF) interferer is present, indicative that the communications channel is busy.

2. The communications device according to claim 1, wherein the demodulator is configured to demodulate the received communications signal into in-phase (I) and quadrature (Q) signal components.

3. The communications device according to claim 2, and further comprising a vector magnitude determinator configured to receive I and Q signal components and determine complex time domain samples as magnitude and phase.

4. The communications device according to claim 1, wherein the processor is configured to determine the mean over the time domain magnitude samples before determining the variance over time domain samples.

5. The communications device according to claim 1, wherein the variance ratio below the threshold is indicative that the RF interferer signal is present.

6. The communications device according to claim 1, wherein the variance ratio above a threshold is indicative of noise on the communications channel without the RF interferer signal.

7. A communications device, comprising:
    a transceiver configured to transmit and receive communications signals over a communications channel and comprising:
    a demodulator configured to demodulate a received communications signal into complex time domain samples;

a processor coupled to the demodulator and having a buffer and configured to:
  normalize all complex time domain samples within the buffer to fractional amplitude values,
  determine the variance over time domain magnitude samples based on a computed mean over all normalized time domain samples,
  perform a complex Fast Fourier Transform (CFFT) on all complex time domain samples as magnitude and phase to obtain frequency domain samples, and
  determine the variance over the frequency domain samples based on a computed mean over all frequency domain magnitude samples; and
a comparator configured to compare a variance ratio of the variance in the time domain magnitude samples and the variance in the frequency domain samples with a threshold to determine if a radio frequency (RF) interferer is present, indicative that the communications channel is busy, wherein in response to the indication that the communications channel is busy, the transceiver will not transmit a communications signal over the communications channel.

8. The communications device according to claim 7, wherein a variance ratio below the threshold is indicative that the RF interferer signal is present.

9. The communications device according to claim 7, wherein the variance ratio above a threshold is indicative of noise on the communications channel without the RF interferer signal.

10. A method of detecting a radio frequency (RF) interferer signal on a communications channel, comprising:
  receiving a communications signal within a receiver;
  demodulating the communications signal within a demodulator and obtaining a plurality of complex time domain samples;
  normalizing all complex time domain samples within a buffer to fractional amplitude values;
  determining the variance over time domain magnitude samples based on a computed mean over all normalized time domain samples;
  performing a complex Fast Fourier Transform (CFFT) on all complex time domain samples as magnitude and phase to obtain frequency domain samples;
  determining the variance over the frequency domain samples based on a computed mean over all frequency domain magnitude samples; and
  comparing a variance ratio of the variance in the time domain magnitude samples and the variance in the frequency domain samples with a threshold to determine if a RF interferer is present, indicative that the communications channel is busy.

11. The method according to claim 10, further comprising demodulating the communications signal to obtain in-phase (I) and quadrature (Q) signal components; and
  processing the I and Q signal components to obtain the plurality of complex time domain samples as magnitude and phase.

12. The method according to claim 10, wherein the variance ratio below the threshold is indicative that the RF interferer signal is present.

13. The method according to claim 10, wherein the variance ratio above a threshold is indicative of noise on the communications channel without the RF interferer signal.

14. The method according to claim 10, further comprising determining the mean over the time domain magnitude samples before determining the variance over time domain samples.

15. The method according to claim 10, further comprising determining the mean over the frequency domain samples before determining the variance over the frequency domain samples.

16. The method according to claim 10, wherein the RF interferer comprises a communications signal transmitted from a second wireless communications device.

* * * * *